United States Patent Office 3,128,596
Patented Apr. 14, 1964

3,128,596
BIS(ALKYLCYCLOHEXYL)ALKANES AND USE AS HIGH ENERGY FUELS
Herbert E. Morris, Winchester, Mass., assignor, by mesne assignments, to Monsanto Research Corporation, Everett, Mass., a corporation of Delaware
No Drawing. Filed Oct. 3, 1960, Ser. No. 59,838
14 Claims. (Cl. 60—35.4)

This invention relates to alkyl substituted dicyclohexyl alkanes wherein each cyclohexyl group is substituted with at least one alkyl group. In one aspect, this invention relates to the bis(alkylcyclohexyl)alkanes as new compounds. In another aspect, this invention relates to methods for preparing the bis(alkylcyclohexyl)alkanes. In another aspect, this invention relates to high energy fuel compositions for use in reaction type power plants. In another aspect, this invention relates to improved methods of developing thrust. In another aspect, this invention relates to methods of operating reaction type power plants, such as jet propulsion type engines, including rocket, ram-jet, pulse-jet, and turbo-jet engines, and turbine type engines, including turbo-prop and gas turbine engines.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a rocket, ram-jet, turbo-jet, or pulse-jet type engine, exhaustion of the high temperature gases is directed in a rearward direction to produce a true jet propulsion. In a gas turbine or turbo-prop type engine, the exhaustion of the high temperature gases is directed into a turbine which drives a propeller or other mechanical means for developing a forward thrust. Reaction power plants may be used in widely different types of vehicles such as in space ships, aircraft, boats, guided missiles, automobiles, and the like.

Heretofore it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such application because of weight and volume limitations. Under some conditions, the fuel will be heated to a temperature as high as 500° F. or higher but the presently available JP-4 fuel is thermally stable to a temperature of only about 400° F. Therefore, it is desirable to have a fuel which is thermally stable at temperatures at least as high as 500° F.

Another serious disadvantage of the prior art known fuels is the low heat of combustion of such fuels. Aircraft generally, and particularly military aircraft, are being designed for higher and higher speeds requiring higher energy level fuels. The fuel must not only have a high energy level on a weight basis, or high B.t.u./lb., but also a high energy level on a volume basis, or a high B.t.u./gal., since wing sections are being made thinner in order to reduce drag and the space for storage of fuel is limited. Thus, aircraft are very often volume limited as well as weight limited for the storage of fuel. It is particularly desirable to provide a fuel having a high heat of combustion, preferably greater than 18,400 B.t.u./lb., and at the same time obtain the other characteristics necessary for a good fuel of this type.

Another disadvantage of the presently known fuels is that they have high vapor pressures and tend to flash-off rapidly in power plants operated at high elevations and high temperatures, thereby resulting in an appreciable loss of fuel. Although this difficulty can be overcome by pressurizing the fuel tanks, the structural strength of the fuel tanks must also be increased, adding to the weight and volume of the vehicle. Therefore, it is desirable that the fuel have a boiling point at least above 400° F. in order to avoid additional weight and volume requirements.

An object of this invention is to provide the bis(alkylcyclohexyl)alkanes as new compounds.

Another object of this invention is to provide a process for preparing the bis(alkylcyclohexyl)alkanes.

Another object of this invention is to provide a high energy fuel composition for use in reaction type power plants.

Another object of this invention is to provide improved methods of developing thrust.

Another object of this invention is to provide improved methods of operating reaction type power plants, particularly jet propulsion type engines, including rocket, ram-jet, turbo-jet and pulse-jet engines, and turbine type engines, including turbo-prop and gas turbine engines.

Other aspects, objects and advantages of this invention will be apparent from a consideration of the accompanying disclosure and the appended claims.

According to this invention, there are provided, as new compounds, bis(alkylcyclohexyl)alkanes, preferably of the formula selected from the group consisting of

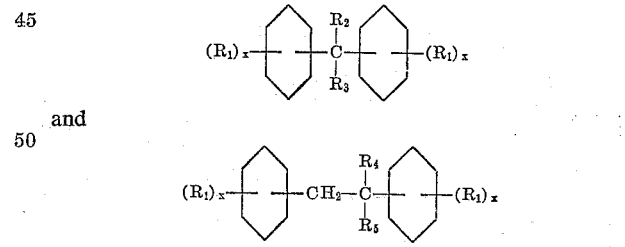

and wherein $R_1$ is alkyl, $R_2$ and $R_3$ are selected from the group consisting of hydrogen and alkyl, $R_2$ and $R_3$ being the same or different but the sum of the number of carbon atoms of $R_2$ and $R_3$ being not greater than 5, $R_4$ and $R_5$ are selected from the group consisting of hydrogen and alkyl, $R_4$ and $R_5$ being the same or different but the sum of the number of carbon atoms of $R_4$ and $R_5$ being not greater than 4, and $x$ is an integer of from 1 to 4.

Also, according to the invention, there are provided methods for producing bis(alkylcyclohexyl)alkanes, preferably bis(alkylcyclohexyl)alkanes as defined above, by reacting an alkyl-substituted benzene with a compound selected from the group consisting of aliphatic aldehyde, aliphatic acetylene, dihaloalkane, monohaloalkene, alkarylalkyl halide, and aliphatic ketone in the presence of a catalyst and hydrogenating the resulting bis(alkylphenyl)alkane in the presence of a hydrogenation catalyst at an elevated pressure to form the bis-(alkylcyclohexyl)alkane as product of the process.

Also, according to the invention, there are provided high energy fuel compositions comprising, as an essential ingredient, a bis(alkylcyclohexyl)alkane, preferably as defined above.

Also, according to the invention, there are provided improved methods of developing thrust, said methods comprising oxidizing a high energy fuel composition, comprising, as an essential ingredient, a bis(alkylcyclohexyl) alkane, preferably as defined above, with an oxidizing agent in a reaction chamber to produce a mass of high temperature gases and exhausting said gases from said reaction chamber in a manner so as to develop a large amount of thrust.

Also, according to the invention, there are provided improved methods of operating reaction type power plants, said methods comprising, injecting a stream of an oxidizing agent and a stream of a fuel composition comprising, as an essential ingredient, a bis(alkylcyclohexyl) alkane, preferably as defined above, into the combustion chamber of said reaction type power plant in such proportion as to produce a combustible mixture, subjecting said combustible mixture to combustion, and exhausting the resulting gases from said combustion chamber so as to impart thrust thereto.

Preferably, the bis(alkylcyclohexyl)alkanes of this invention are the alkanes substituted on either the same carbon atom or adjacent carbon atoms with two cyclohexyl groups which are each substituted with one or more alkyl groups. The alkane preferably contains from 1 to 6 carbon atoms in the chain and, therefore, $R_2$ and $R_3$ in the above defined formulas contain from 1 to 5 carbon atoms, being either the same or different but the sum of the number of carbon atoms being not greater than 5, and $R_4$ and $R_5$ contain from 1 to 4 carbon atoms, being the same or different but the sum of $R_4$ and $R_5$ being not greater than 4. The alkyl groups substituted on each of the cyclohexyl rings preferably contain from 1 to 4 carbon atoms which can be substituted on each cyclohexyl ring from 1 to 4 times. Thus, in the formulas given above, $R_1$ is preferably an alkyl group of from 1 to 4 carbon atoms and $x$ is an integer of from 1 to 4. The places of substitution of the alkyl groups on the cyclohexyl rings are not limited and such substitutions can be made in the ortho, meta, and para positions. Where each cyclohexyl ring is substituted with one alkyl group, the new compounds of this invention are identified as bis(alkylcyclohexyl)alkanes; where two alkyl groups are substituted on each cyclohexyl ring, the novel compounds of this invention are identified as bis(dialkylcyclohexyl)alkanes; where three alkyl groups are substituted on each cyclohexyl ring, the novel compounds of this invention are identified as bis(trialkylcyclohexyl) alkanes; and where four alkyl groups are substituted on each cyclohexyl ring the novel compounds of this invention are identified as bis(tetraalkylcyclohexyl)alkanes.

Illustrated examples of some of the novel compounds of this invention are as follows:

Bis(methylcyclohexyl)methane
Bis(ethylcyclohexyl)methane
Bis(isopropylcyclohexyl)methane
Bis(butylcyclohexyl)methane
Bis(dimethylcyclohexyl)methane
Bis(trimethylcyclohexyl)methane
Bis(triisopropylcyclohexyl)methane
Bis(tetramethylcyclohexyl)methane
1,1-bis(methylcyclohexyl)ethane
1,1-bis(ethylcyclohexyl)ethane
1,1-bis(butylcyclohexyl)ethane
1,1-bis(dimethylcyclohexyl)ethane
1,1-bis(trimethylcyclohexyl)ethane
1,1-bis(tetramethylcyclohexyl)ethane
1,2-bis(methylcyclohexyl)ethane
1,2-bis(dimethylcyclohexyl)ethane
1,2-bis(trimethylcyclohexyl)ethane
1,2-bis(tetramethylcyclohexyl)ethane
1,2-bis(ethylcyclohexyl)ethane
1,2-bis(isopropylcyclohexyl)ethane
1,2-bis(methylcyclohexyl)propane
1,2-bis(dimethylcyclohexyl)propane
1,2-bis(trimethylcyclohexyl)propane
1,2-bis(tetramethylcyclohexyl)propane
1,2-bis(ethylcyclohexyl)propane
1,2-bis(isopropylcyclohexyl)propane
1,1-bis(methylcyclohexyl)propane
1,1-bis(dimethylcyclohexyl)propane
1,1-bis(trimethylcyclohexyl)propane
1,1-bis(tetramethylcyclohexyl)propane
1,1-bis(ethylcyclohexyl)propane
1,1-bis(isopropylcyclohexyl)propane
2,2-bis(methylcyclohexyl)propane
2,2-bis(dimethylcyclohexyl)propane
2,2-bis(trimethylcyclohexyl)propane
2,2-bis(tetramethylcyclohexyl)propane
2,2-bis(ethylcyclohexyl)propane
2,2-bis(isopropylcyclohexyl)propane
1,1-bis(methylcyclohexyl)isobutane
1,1-bis(dimethylcyclohexyl)isobutane
1,1-bis(trimethylcyclohexyl)isobutane
1,1-bis(tetramethylcyclohexyl)isobutane
1,1-bis(ethylcyclohexyl)isobutane
1,1-bis(isopropylcyclohexyl)isobutane
1,2-bis(methylcyclohexyl)butane
1,2-bis(dimethylcyclohexyl)butane
1,2-bis(trimethylcyclohexyl)butane
1,2-bis(tetramethylcyclohexyl)butane
1,2-bis(ethylcyclohexyl)butane
1,2-bis(isopropylcyclohexyl)butane The bis(alkylcyclohexyl)alkanes of this invention are preferably produced by condensing an alkyl-substituted benzene with either an aliphatic aldehyde, aliphatic acetylene, aliphatic ketone, dihaloalkane, monohaloalkene, or alkarylalkyl halide and then hydrogenating the resulting bis(alkylphenyl)alkane to form the bis(alkylcyclohexyl) alkane. Suitable alkyl-substituted benzene reactants for use in this invention are those benzenes which are substituted with from 1 to 4 alkyl groups containing from 1 to 4 carbon atoms in a preferred embodiment. Illustrative examples of some suitable benzene reactants include toluene, or methylbenzene, cumene or isopropylbenzene, ethylbenzene, butylbenzene, xylene or dimethylbenzene, diethylbenzene, diisopropylbenzene, mesitylene or 1,3,5-trimethylbenzene, triisopropylbenzene, and durene or 1,2,4,5-tetramethylbenzene. The alkyl substituents may be located in either the ortho, meta or para positions.

The other reactant condensed with the alkyl-substituted benzene reactant in the process of this invention may be either an aliphatic aldehyde, aliphatic acetylene, aliphatic ketone, dihaloalkane, monohaloalkene, or alkarylalkyl halide. If the reactant is either an aldehyde or an acetylene, the product produced will be one in which the two phenyl groups are substituted on a single terminal carbon atom of the alkane chain. If the reactant is a ketone or a monohaloalkene, the phenyl groups are substituted on the same carbon atom but at some point intermediate the length of the alkane chain. However, if the reactant is a dihaloalkane, the phenyl groups are substituted on either the same or adjacent carbon atoms depending upon the nature of the dihalo substitution on the alkane chain. The product where the reactant is an alkarylalkyl halide is one in which the phenyl groups are substituted on either the same carbon atom or on separate terminal carbon atoms of the alkane chain. Examples of some suitable aldehydes which can be used in the process of this invention include formaldehyde, acetaldehyde, propionaldehyde, butyraldehyde, isobutylaldehyde, valeraldehyde, and caproaldehyde. Paraformaldehyde may also be used as a reactant since it is capable of forming formaldehyde under reaction conditions. Suitable acetylenes for use in the process of this invention include acetylene, methylacetylene, ethylacetylene, butylacetylene, hexylacetylene, and the like. Examples of suitable ketone reactants include dimethylketone or acetone, methylethylketone, diethylketone, methylpropylketone, ethylpropylketone, and the like. The dihaloalkane reactants for use in this invention are preferably the dichloroalkanes although the dibromo-, difluoro-, and diiodoalkanes can also be used. Examples of suitable dichloroalkanes include 1,2-dichloroethane, 1,2-dibromopropane, 1,2-dichloropropane, 1,2-dichlorobutane, 1,2-difluorobutane, 1,2-diiodobutane, 1,2-dichloropentane, 1,2-dibromohexane, and the like. Examples of suitable monohaloalkenes include 2-chloropropene, 2-bromopropene, 2-fluoropropene, 2-chlorobutene, 2-iodobutene, and 2-bromobutene. Examples of suitable alkarylalkyl halides include methylbenzyl bromide, ethylbenzyl chloride, methylphenylethyl fluoride, methylphenylbutyl iodide, and butylphenylpropyl chloride.

Using ethylbenzene as an alkyl-substituted benzene reactant and acetaldehyde as the other reactant, the condensation reaction of this invention can be illustrated by the following equation:

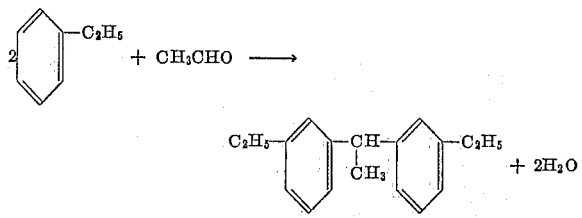

The 1,1-bis(ethylphenyl)ethane formed as product in this condensation step is then hydrogenated to form 1,1-bis-(ethylcyclohexyl)ethane as illustrated in the following equation:

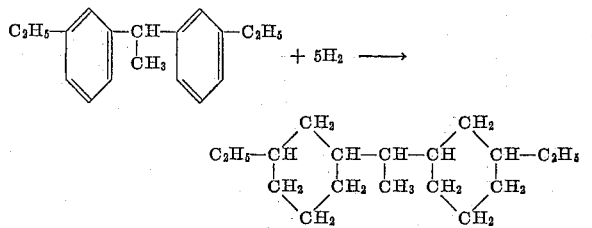

The reaction between the acetylene, ketone, and dihaloalkane reactants take place in a manner similar to the reactions illustrated above except that hydrogen halide instead of $H_2O$ is formed as a by-product in the reaction with a dihalo alkane, alkarylalkyl halide, and monohaloalkene.

The condensation reaction involved in the first step of this invention can be carried out at room temperature. However, depending upon the nature of the reactants and the particular catalyst used, it is very often desirable to carry out this reaction step at a temperature either below room temperature or at a temperature above room temperature in order to obtain satisfactory yields of the desired product. Preferably the reaction with alkarylalkyl halide is carried out at a temperature above 100° C. Therefore, the condensation reaction can be carried out at a temperature as low as −20° C. or as high as 200° C.

Ordinarily, the condensation reaction is carried out at substantially atmospheric pressure, although either subatmospheric or superatmospheric pressures may be used with particular reactants, as for example, superatmospheric pressures are employed with acetylene-type reactants.

The condensation reaction is preferably carried out in the presence of a catalyst in order to obtain suitable yields of the desired product in reasonable reaction times. Suitable catalysts include the mineral acids such as hydrochloric acid, sulfuric acid, perchloric acid, and phosphoric acid; the sulfonic acids such as the alkanesulfonic acids and the arylsulfonic acids; the Lewis-type acids such as aluminum chloride, boron trichloride, antimony trichloride, and titanium tetrachloride; low molecular weight aliphatic carboxylic acids such as formic acid and propionic acid, and aluminum amalgam. Ordinarily, the mineral acid will comprise from about 80% to about 95% of the acid and the remainder water. Preferably, the alkanesulfonic and the arylsulfonic acids will comprise from 92% to 95% sulfonic acid, from 1% to 2% sulfuric acid, and from 3% to 6% water. Suitable alkane sulfonic acids for use in this invention as catalysts preferably contain from 1 to 12 carbon atoms and include, for example, methanesulfonic acid, ethanesulfonic acid, butanesulfonic acid, and the like. Mixtures of these lower alkane sulfonic acids can also be used as catalysts. Suitable arylsulfonic acids for use as catalysts include the benzenesulfonic acids, toluenesulfonic acids, and chlorobenzenesulfonic acids, with p-toluenesulfonic acid and 4-chlorobenzenesulfonic acid being preferred. In many instances, the catalytic activity of these acidic type catalysts can be greatly enhanced through the addition of a small amount of an acid salt of a metal such as copper, mercury, cadmium, silver, and zinc. Thus, the phosphates, sulfates, acetates, chlorides, oxides, and formates of these metals in their higher valence state are suitable promoters of the condensation reaction when used in an amount preferably less than 1 weight percent of the amount of acid catalyst used. A preferred catalyst is sulfuric acid in a concentration of 90% by weight.

The amount of catalyst present in the reaction zone in the condensation step can be varied over wide limits depending upon the nature of the reactants and the catalysts used. The amount of catalyst used is also determined to a considerable extent by the temperature selected for conducting the reaction. Thus, at higher temperatures the amount of catalyst required in the reaction zone is smaller than when lower temperatures are used and the use of excessive amounts of catalyst at the more elevated temperatures will promote the formation of undesired side products. Ordinarily, the amount of catalyst used will be between about 1 part of catalyst per part of substituted-benzene reactant charged to about 1 part of catalyst per 25 parts of substituted-benzene reactant charged.

Preferably, the condensation reaction is carried out using an amount of the substituted-benzene reactant which is in excess of the stoichiometric amount required for effecting the condensation. The excess substituted-benzene reactant serves as a solvent or diluent in the condensation reaction. Ordinarily, a substituted benzene will be employed in an amount of from 25% to 200% in excess of that stoichiometrically required.

The condensation reaction step of this invention can be carried out either batchwise or in a continuous manner. Preferably, the acid catalyst and water formed in the reaction are separated from the hydrocarbon by decantation since the reaction effluent of the condensation step is a heterogeneous mixture which separates into a hydrocarbon layer and an acid layer upon completion of the reaction. The bis(alkylphenyl)alkane is separated from the unreacted alkyl-substituted benzene by fractional distillation or by any other suitable method as will be well known to one skilled in the art.

The bis(alkylphenyl)alkane formed in the condensation step is then hydrogenated in a second step to form ths novel bis(alkylcyclohexyl)alkanes of this invention. The hydrogenation reaction is preferably carried out in the presence of a hydrogenation catalyst such as nickel, platinum, or palladium which may be used either alone in an extremely fine state of subdivision or supported on a suitable inert material such as keiselguhr, diatomaceous earth, activated charcoal, alumina, silica, silica-alumina, or the like. If a supported catalyst is used, the metal may be present on the support in an amount of from approximately 0.05% to 85% by weight. A preferred nickel catalyst composition contains from approximately 50% to 75% by weight of the active metal. The catalyst, whether supported or finely divided metal, is used in an amount corresponding to from 0.05% to 20% by weight, or more, of the metal based on the weight of the bis(alkylphenyl)alkane to be hydrogenated.

The hydrogenation reaction is ordinarily carried out at an elevated temperature preferably above about 100° C. but usually less than 350° C. Superatmospheric pressures are ordinarily employed in effecting the hydrogenation reaction and pressures as high as 10,000 p.s.i.g. or higher can be used if desired. Ordinarily, the pressure will be greater than 150 p.s.i.g.

Preferably, the hydrogenation reaction is carried out using an inert diluent or solvent in the hydrogenation zone. n-Hexane is a very suitable solvent for this purpose; however, any saturated paraffin containing from about 3 carbon atoms to 12 carbon atoms can be used.

Upon completion of the hydrogenation reaction, the bis(alkylcyclohexyl)alkane product is readily recovered by distillation procedures, preferably under reduced pressure, or by any other suitable method well known to those skilled in the art.

The advantages, desirability and usefulness of the present invention are illustrated by the following examples.

EXAMPLE 1

In this example, bis(2,4,6-trimethylcyclohexyl)methane was prepared by hydrogenating dimesitylmethane which was formed by condensing mesitylene with formaldehyde. The condensation reaction was conducted in a 50-liter reaction flask charged with 1650 g. (50 moles) of 91% paraformaldehyde and 4500 g. (240 moles) of 88% formic acid. This mixture was heated with stirring at 80° C. until complete solution had been effected and then 18,000 g. (150 moles) of mesitylene was added rapidly. The resulting mixture was then heated with stirring under reflux at a temperature of 150° C. for 6 hours. Upon cooling overnight, the reaction mixture separated into a lower acidic layer which was removed by siphoning and discarded. Removal of the acidic layer resulted in precipitation of the product as a solid material suspended in the upper organic layer. This product was then washed with water and then dissolved in 7000 ml. of boiling benzene. The hot benzene solution was then washed with water and dilute sodium carbonate solution until neutral. The benzene solution was then cooled, resulting in the formation of a colorless solid precipitate of the dimesitylmethane. The product was separated by filtration and air dried to obtain 7786 g., amounting to a yield of 61.8%. The dimesitylmethane had a melting point of 131.5–132° C. and a vapor phase chromatography showed the product to be 99.90% pure.

In the hydrogenation step, 2500 g. (10 moles) of the dimesitylmethane, 250 g. of a catalyst comprising 65% nickel supported on kieselguhr, and 2000 ml. of n-hexane were charged into a 3-gallon stirred autoclave. After sealing the autoclave, hydrogen was introduced into the autoclave maintained at 160° C. with an initial hydrogen pressure of 3300 p.s.i.g. Upon completion of the hydrogenation reaction, the autoclave was opened and the catalyst was removed by filtration. The bis(2,4,6-trimethylcyclohexyl)methane was separated from the n-hexane solvent by distillation under reduced pressure in a 2.3 x 92 cm. spinning band column to obtain 2069 g. (79% yield) of the product boiling at 129–136° C./2 mm. The product had a refractive index $n_D^{20}$ 1.4816 and density $d_4^{20}$ 0.884. The product was found to contain 86.6 weight percent carbon and 13.5 weight percent hydrogen as compared with calculated values of 86.3 weight percent carbon and 13.7 weight percent hydrogen. The proposed structure for this compound was confirmed by an inspection of the infrared spectrum.

EXAMPLE 2

In this example, 1,1-bis(ethylcyclohexyl)ethane was prepared by hydrogenating 1,1-bis(ethylphenyl)ethane which was prepared by condensing ethylbenzene with acetaldehyde. Sulfuric acid catalyst for use in effecting the condensation reaction was prepared by adding 5.4 liters (100 moles) 96% sulfuric acid to 750 ml. of water containing in a 22-liter round-bottom reaction flask. After the acid had been cooled to 0° C. by an external Dry Ice-methanol bath, 6.8 kg. (64 moles) of ethylbenzene was added. The mixture was again cooled to a temperature of 0° C. and a solution of 1100 g. of acetaldehyde (25 moles) in 1000 g. (10 moles) of ethylbenzene precooled to 0° C. added slowly with stirring while keeping the reaction mixture at a temperature of 0° C. After this addition was complete, the viscous, orange-red mixture was stirred for a further 30 minutes and then transferred by siphoning onto 5 kg. of crushed ice. The lower acidic layer which formed was removed by siphoning and discarded. The organic layer was washed once with water and the emulsion which formed was broken by the addition of 1 liter of butanol. Washing of the organic layer was then continued with water and dilute potassium carbonate solution until the washings were not acidic. Butanol and excess ethylbenzene were removed from the product by distillation at atmospheric pressure through a Claisen head. Thereafter, the 1,1-bis(ethylphenyl)ethane was recovered by distillation at reduced pressure. The product obtained was purified by distillation from sodium to obtain 2281 g. (38% yield) of the product having a boiling point of 127–130° C./0.2 mm. and a refractive index $n_D^{25}$ 1.5503.

In effecting the hydrogenation step, 2228 g. (9.3 moles) of the 1,1-bis(ethylphenyl)ethane, 223 g. of a catalyst comprising 65% nickel supported on kieselguhr, and 2400 ml. of n-hexane were charged to a 3-gallon stirred autoclave. The autoclave was sealed and hydrogen introduced into the reaction mixture maintained at 230° C. to obtain an initial hydrogen pressure of 4500 p.s.i.g. Upon completion of the hydrogenation, the autoclave was opened and the catalyst was separated from the product by filtration. The solvent was removed from the filtrate by distillation and the product recovered by distillation at reduced pressure to obtain 1867 g. (80% yield) of the 1,1 - bis(ethylcyclohexyl)ethane boiling at 117–122° C./0.7 mm. having a refractive index $n_D^{20}$ 1.4795 and a density $d_4^{20}$ 0.8792. The product was found to contain 86.7 weight percent carbon and 13.4 weight percent hydrogen as compared with calculated values of 86.3 weight percent carbon and 13.7 weight percent hydrogen. The structural formula of the product was confirmed by an inspection of the infrared spectrum of the product.

EXAMPLE 3

In this example, 1,1-bis(dimethylcyclohexyl)ethane was prepared by hydrogenating 1,1-dixylylethane which was prepared by condensing xylene with acetaldehyde. The 1,1-dixylylethane was prepared by adding over a period of 1 hour, 6.6 kg. (62.3 moles) of xylene to a 22-liter round-bottom reaction flask containing 10.6 kg. of 90% aqueous sulfuric acid maintained at −10° C. in a Dry Ice-methanol bath. Thereafter, a solution of 1.1 kg. (25 moles) of acetaldehyde in 1 kg. of xylene was added slowly at a temperature of −10° C. over a period of 2 hours with continued cooling and stirring. The resulting brownish-red mixture was stirred at a temperature of from 0° C. to −10° C for an additional 30 minutes and then transferred by siphoning to a polyethylene bucket containing approximately 4 kg. of shaven ice. The lower acidic layer formed was withdrawn by siphoning and discarded. The upper layer containing the organic material was an emulsion which separated on standing overnight. The organic layer formed was separated and neutralized by washing with three 4-liter portions of aqueous saturated sodium bicarbonate solution. The washing process was then continued by washing twice with water and once with aqueous saturated sodium chloride solution. The organic layer was then dried over anhydrous sodium sulfate and washed with approximately 1 liter of xylene. The organic layer and xylene washings were then combined in a 12-liter round-bottom flask and the excess xylene removed by distillation at atmospheric pressure through a Claisen head. The 1,1-dixylylethane was recovered by distillation under reduced pressure. The crude product was redistilled from sodium under reduced pressure to obtain 2265 g. (38% yield) of the product boiling at 135–141° C./0.75 mm. and having a refractive index $n_D^{20}$ 1.5625.

The hydrogenation of the 1,1-dixylylethane was conducted in a 3-gallon stirred autoclave which was charged with 2265 g. (9.5 moles) of the 1,1-dixylylethane, 260 g. of catalyst comprising 65% nickel supported on kieselguhr, and 1.8 liters of n-hexane. After sealing the autoclave, hydrogen was introduced at an initial temperature of 150° C. to obtain a hydrogen pressure of 3950 p.s.i.g. Upon completion of the reaction, the autoclave was opened and the catalyst was removed by filtration. The hexane solvent was removed by distillation and the crude liquid residue further distilled under reduced pressure through a spinning band column to obtain 2005 g. (84% yield) of an isomeric mixture of 1,1-bis(dimethylcyclohexyl)ethane boiling at 102–106° C./0.45–0.5 mm. and having a refractive index $n_D^{20}$ 1.4840 and a density $d_4^{20}$ 0.8918. This product was found to contain 86.6 weight percent carbon and 13.4 weight percent hydrogen as compared with calculated values of 86.3 weight percent carbon and 13.7 weight percent hydrogen. The structural formula of this product was confirmed from an inspection of the infrared spectrum of the product.

EXAMPLE 4

In this example, bis(ethylcyclohexyl)methane was prepared by hydrogenating bis(ethylphenyl)methane which was prepared by condensing ethylbenzene with ethylbenzyl chloride. In the condensation reaction, a catalyst of aluminum amalgam was used. The catalyst was prepared immediately before use by covering 42.5 g. of aluminum turnings with a 5% solution of mercuric chloride and quickly decanting this solution as soon as the aluminum turnings darkened. The turnings were then washed twice with water followed by two washings with methanol. The thusly prepared catalyst was then introduced into a 22-liter flask containing 9010 g. (85 moles) of ethylbenzene. After heating this mixture to a temperature of 130° C. 500 ml. of ethylbenzyl chloride was added dropwise over a period of 2 hours with stirring. During the next two hours, an additional 500 ml. of ethylbenzyl chloride was added. The reaction mixture was then digested for approximately 2 hours, at which time the reaction mixture began to foam with an exceedingly vigorous evolution of hydrogen chloride. After the violent reaction had subsided, the remainder of the ethylbenzyl chloride was added dropwise in a period of 2 hours to make the total amount of ethylbenzyl chloride reactant 2635 g. (17 moles). Thereafter, the reaction mixture was cooled to room temperature and hydrolyzed by the addition of 2 liters of cold tap water to the stirred mixture. Upon standing, two layers formed and the aqueous layer was removed and discarded. The organic layer was washed with stirring, twice with 2 liters of a 1:1 mixture of saturated sodium bicarbonate and saturated sodium chloride solutions and once with a liter of saturated sodium chloride solution. After the organic phase had been dried over anhydrous sodium sulfate, it was distilled first at atmospheric pressure and then at 50 mm. to remove the excess ethylbenzene. The dark residue obtained was then distilled at 2–3 mm. pressure to obtain 2413 g. of a pale blue oil, boiling in the range of 123–150° C. Redistillation of this oil from sodium gave 2338 g. (61.2% yield) of the bis(ethylphenyl)methane having a pale blue color, boiling at 127° C./2.2–0.7 mm. and having a refractive index $n_D^{20}$ 1.5553.

In effecting the hydrogenation step, 2338 g. (10.4 moles) of the bis(ethylphenyl)methane prepared above, 234 g. of a catalyst comprising 65% nickel supported on kieselguhr, and 3000 ml. of n-hexane were charged to a 3-gallon stirred autoclave. The autoclave was sealed and hydrogen introduced into the reaction mixture maintained at 150° C. to obtain an initial hydrogen pressure of 2300 p.s.i.g. Upon completion of the hydrogenation, the autoclave was openend and the catalyst was separated from the product by filtration. The solvent was removed from the filtrate by distillation and the product recovered by distillation in a 2 x 90 cm. column to obtain 1951 g. of bis(ethylcyclohexyl)methane boiling at 88° C./0.7 mm. having a refractive index $n_D^{20}$ 1.4761 and a density $d_4^{20}$ 0.8777. The product was found to contain 86.4 weight percent carbon and 13.6 weight percent hydrogen compared with calculated values of 86.4 weight percent carbon and 13.6 weight percent hydrogen. The structural formula of the product was confirmed by an inspection of the infrared spectrum of the product.

EXAMPLE 5

In this example, 2,2-bis(methylcyclohexyl)propane was prepared by hydrogenating 2,2-ditolylpropane which was prepared by condensing toluene with 2-chloropropene. In the condensation reaction, a 50-liter flask was charged with 900 g. (6.8 moles) of anhydrous aluminum chloride and 31.4 liters (293 moles) of toluene. The mixture was stirred and kept at 5° C. by an external methanol-Dry Ice bath during the addition of 4500 g. (58.8 moles) of 2-chloropropene dissolved in 5400 ml. of chilled toluene. After the addition was complete, the mixture was stirred at 25° C. for 16 hours and then at 50° C. for 30 minutes. At the end of this time, the mixture was cooled to 25° C. and transferred by siphoning with vigorous stirring into 10 liters of water containing 10 kg. of cracked ice. The upper organic layer formed was separated and washed with aqueous saturated sodium bicarbonate solution and then with water until neutral to pH paper. The excess toluene present was then removed by distillation at 50 mm. pressure. Thereafter, the product was further purified by distillation at reduced pressure through a 1 x 24 inch Vigreux column to obtain a fraction boiling at 102° C./1.5 mm.–139° C./2 mm. This fraction was then redistilled from sodium to obtain the 2,2-ditolylpropane boiling at 124° C./2 mm.–120° C./0.4 mm. and having a refractive index $n_D^{20}$ 1.5580–1.5596.

The hydrogenation of the 2,2-ditolylpropane was conducted in a 3-gallon stirred autoclave which was charged with 3869 g. (17.3 moles) of 2,2-ditolylpropane, 387 g. of catalyst comprising 65% nickel supported on kieselguhr, and 2000 ml. of n-hexane. After sealing the autoclave, hydrogen was introduced at an initial temperature of 150° C. to obtain an initial hydrogen pressure of 1700 p.s.i.g. Upon completion of the reaction, the autoclave was opened and the catalyst was removed by filtration. The solvent was removed by distillation and the crude liquid residue further distilled under reduced pressure through a packed column to obtain 1991 g. of 2,2-bis(methylcyclohexyl)propane boiling at 123–129.5° C./3.6 mm. and having a refractive index $n_D^{20}$ 1.4824 and a density $d_4^{20}$ 0.889. This product was found to contain 86.6 weight percent carbon and 13.5 weight percent hydrogen as compared with calculated values of 86.3 weight percent carbon and 13.7 weight percent hydrogen. The proposed structural formula of this product was confirmed from an inspection of the infrared spectrum.

EXAMPLE 6

In this example, 1,1-bis(methylcyclohexyl)ethane was prepared by hydrogenating 1,1-ditolylethane which was prepared by condensing toluene with acetaldehyde. In the condensation step, a 2-liter flask was charged with 520 g. (5.66 moles) of toluene and 890 g. of 90% sulfuric acid. After cooling the mixture to −5° C., a solution of 100 g. (2.27 moles) of acetaldehyde in 86 g. (0.93 mole) of toluene was added during a 4-hour period with rapid stirring. The stirring was continued for an additional 30 minutes after the addition was completed. At the end of this time, 400 g. of finely ground ice was added to the reaction mixture. Upon the formation of two phases, the layers were separated and the organic layer was washed using a 1:1 saturated sodium chloride: saturated sodium bicarbonate solution. Thereafter, the washed oil was fractionated to remove the unreacted toluene and to obtain 405.2 g. of 1,1-ditolylethane boiling at 123–131° C./3 mm.

The hydrogenation step was conducted as in Example 3 using a catalyst of nickel supported on kieselguhr and n-hexane solvent. The 1,1-bis(methylcyclohexyl)ethane was recovered by fractionation.

EXAMPLE 7

In this example, various bis(alkylcyclohexyl)alkanes were subjected to inspection tests in order to show the thermal and physical properties of these materials and their suitability in the operation of a reaction type power plant. The results of these tests are given in Table I.

luminosity reading of 45 was obtained. The same procedure is repeated to obtain temperature rise values at a luminosity reading of 45 for isooctane and tetralin which serve as reference points of 100 and 0, respectively. The luminometer number is then obtained by dividing the difference between the temperature rise of the test fuel and the temperature rise of tetralin by the difference in the temperature rise of isooctane and the temperature rise of tetralin multiplied by 100.

The thermal decomposition temperatures were obtained using a high temperature-high pressure isoteniscope which consists of a Monel bomb capped at one end and connected to a precision pressure gauge by a Monel diaphragm. The test fuel was heated within the bomb to an elevated temperature under high pressure and the temperature was measured at which the fuel began to decompose and evolve gas as determined by the changes in pressure within the bomb. In this method, the formation of deposits in the decomposition reaction is not measured because some fuels may start to decompose to gas before forming deposits.

EXAMPLE 8

In this example, fuel specifications were determined for some of the bis(alkylcyclohexyl)alkanes of this invention in accordance with the procedure of ASTM D–86–56. These results are reported in Table II.

*Table I*
THERMAL AND PHYSICAL PROPERTIES OF FUELS

| | Fuels | | | | |
|---|---|---|---|---|---|
| | 1 | 2 | 3 | 4 | 5 |
| Hydrogen/carbon ratio | 0.158 | 0.158 | 0.159 | 0.157 | 0.156 |
| Luminometer Number | 70.60 | 62.25 | 73.8 | 29.11 | ---------- |
| Heat of Combustion, b.t.u./lb., net | 18,507 | 18,583 | 18,432 | 18,542 | 18,500 |
| Heat of Combustion, b.t.u./gal., net | 135,460 | 138,654 | 138,700 | 138,503 | 139,000 |
| Freezing Point, °F | −65 | +12 | −70 | −28 | −40 |
| Boiling Point, °F | 569 | 581 | 621 | 599 | 550 |
| Thermal Decomposition Temp., °F | 701 | 696 | 710 | 660 | ---------- |
| Viscosity, cs. at 99° C | 2.0 | 3.04 | 2.5 | 3.1 | 1 11 |
| Thermal Conductivity, b.t.u./hr.-ft.$^2$ °F./ft.: | | | | | |
| At 145.4° F | 0.0623 | 0.0590 | 0.0664 | 0.0610 | ---------- |
| At 219.2° F | 0.0633 | 0.0593 | 0.0638 | 0.0584 | ---------- |
| At 316.4° F | 0.0626 | 0.0618 | 0.0606 | 0.0577 | ---------- |
| Heat Capacity, b.t.u./lb.°F. at 104°F. | 0.47 | 0.506 | 0.455 | 0.440 | ---------- |
| Density, g./ml. at 99° C | 0.821 | 0.837 | 0.847 | 0.842 | 2 0.897 |

Fuels: (1) bis(ethycyclohexyl)methane; (2) bis (2,4,6-trimethylcyclohexyl)methane; (3) 1,1-bis(ethylcyclohexyl)ethane; (4) 1,1-bis(dimethylcyclohexyl)ethane; (5) 1,1-bis(methylcyclohexyl)ethane.

1 At 100° F.
2 At 15° C.

Heats of combustion were obtained with a Parr oxygen bomb calorimeter on both a weight and a volume basis following the ASTM D–240–57T procedure. Freezing points were determined using the ASTM D–1477–57T procedure. Heat capacities were measured using a comparison calorimeter as described by Spear in Anal. Chem. 24, 938 (1952) and Porter and Johnson in Preprints of General Papers, Division of Petroleum Chemistry, Am. Chem. Soc., Vol. 3, No. 1, 15 (1958). Thermal conductivities were measured by the hot-wire method described by Cecil and Munch in Ind. & Eng. Chem. 48, 437 (1956) and Cecil, Koerner and Munch in Ind. & Eng. Chem. Data Sheets, 2, 54 (1957). Densities were determined at a temperature of 99° C. using a Lipkin bicapillary pycnometer. Viscosities at 99° C. were measured using the standard Cannon-Fenske capillary viscometer following ASTM D–445 procedure.

The luminometer numbers were obtained using a luminometer manufactured by the Erdco Engineering Corp. The procedure for determining luminometer numbers involved burning the fuel in a luminosity lamp and measuring the temperature rise across the lamp for various luminosity readings. From a graph of luminosity readings versus lamp temperature rise, the temperature rise for a

*Table II*
DISTILLATION SPECIFICATIONS OF FUELS

| | Fuels | | | |
|---|---|---|---|---|
| | 1 | 2 | 3 | 4 |
| Distillation: | | | | |
| Initial B.P., °F | 540 | 548 | 568.4 | 545.0 |
| 10% fuel evap., °F | 565 | 577 | 619.0 | 592.7 |
| 20% fuel evap., °F | 567 | 579 | 617.9 | 597.2 |
| 50% fuel evap., °F | 569 | 581 | 620.6 | 598.6 |
| 90% fuel evap., °F | 573 | 582 | 624.2 | 601.2 |
| End point, °F | 578 | 586 | 628.7 | 605.3 |
| Sum of Initial Boiling and 50% Fuel Evap | 1,109.0 | 1,129 | 1,189.0 | 1,143.6 |
| Volume Data: | | | | |
| Residue, Percent | 1.25 | 1.30 | 0.95 | 1.27 |
| Distillation Loss, Percent | 0.75 | 1.20 | 0.80 | 0.80 |

The above examples indicate that the bis(alkylcyclohexyl)alkanes of this invention are eminently suitable for use in various reaction type power plants. The bis(alkylcyclohexyl)alkanes have particularly high heats of combustion on both a weight basis and a volume basis and may therefore be very advantageously employed in both jet propulsion type engines and gas turbine type engines where extremely high energy contents are desirable. Another advantage in utilizing the bis(alkylcyclohexyl)alkanes of this invention as reaction type power plant fuels is that they have extremely low freezing points and relatively high boiling points, thus having a very broad boiling range. A high boiling range fuel is very necessary for use in aircraft type engines where the engine is subjected to not only low temperatures, either on the ground or in the air, but also to low pressures at high altitudes. If the freezing point of the fuel is too high, the viscosity of the liquid fuel may become so great as to make supplying the fuel to the engine very difficult or almost impossible. If the fuel has a very low boiling point, large amounts of the fuel will be lost at the higher altitudes by vaporization unless the system is fully pressurized.

The bis(alkylcyclohexyl)alkanes of this invention are also characterized by unusually high thermal stabilities when employed as fuel for a reaction type power plant. This factor is of importance not only in the actual combustion taking place in the engine but also in the fuel system prior to the burning step. For example, it is necessary in high speed aircraft to use the fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the bis(alkylcyclohexyl)alkane fuels of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet, and gas turbine engines, the oxidizing agent is air which is compressed either by a mechanical compressor or aerodynamically. Also, in automotive and ship applications, the oxidizing agent will ordinarily be air. In contrast to these applications, the oxidizing agent will usually be liquid oxygen or other chemical oxidizers, for example, fuming nitric acid, hydrogen peroxide, fluorine, and the like, in guided missile and rocket applications. In some applications, a mixture of oxidizing agents will also be found to be useful.

The bis(alkylcyclohexyl)alkane fuel compositions of the present invention may be blended with other materials such as gasoline, kerosene, mixtures of gasoline and kerosene, other aviation fuels, and with present hydrocarbon jet fuels to produce an improved fuel over the presently available fuels. More particularly, the fuels described herein may be added to the present aliphatic hydrocarbon jet fuels having a heat of combustion of about 112,000 B.t.u./gal. to raise the overall heat of combustion thereof to at least about 120,000 B.t.u./gal. Moreover, the fuels described herein may be used in combination with fuel additives to improve various characteristics of the fuel, including liquid viscosity, burning characteristics, and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.005 and 0.15. The particular fuel-air ratio used will be dependent not only upon the power requirements at the moment but also upon the type of engine. Thus, turbo-jet engines are preferably operated on a fuel-air ratio of about 0.01 to 0.03 whereas ram-jet engines are usually operated at a fuel-air ratio of from 0.03 to 0.07.

Reasonable variation and modification of the invention as described are possible, the essence of which is that there have been provided (1) bis(alkylcyclohexyl)alkanes as new compounds, (2) methods for preparing the bis(alkylcyclohexyl)alkanes, (3) high energy fuel compositions containing said bis(alkylcyclohexyl)alkanes as an essential ingredient, (4) improved methods of developing thrust and (5) methods of operating reaction type power plants.

I claim:

1. The method of developing thrust in a reaction chamber which comprises oxidizing in said reaction chamber a hydrocarbon fuel comprising essentially a bis(alkylcyclohexyl)alkane having a formula selected from the group consisting of

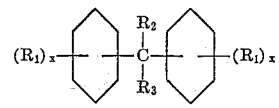

and

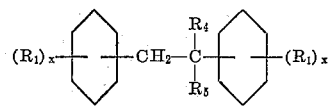

wherein $R_1$ is alkyl of from 1 to 4 carbon atoms, $R_2$, $R_3$, $R_4$ and $R_5$ are selected from the class consisting of hydrogen and alkyl of from 1 to 4 carbon atoms, the sum of the number of carbon atoms in $R_2$ and $R_3$ being not greater than 5 and the sum of the number of carbon atoms in $R_4$ and $R_5$ being not greater than 4, and $x$ is an integer of from 1 to 4, to produce a mass of high temperature gases and exhausting said gases from said reaction chamber in a manner so as to develop a high thrust.

2. The method of operating a reaction type power plant which comprises injecting a stream of an oxidizing agent and a stream of a hydrocarbon fuel comprising essentially the bis(alkylcyclohexyl)alkane defined in claim 1 into the combustion chamber of said power plant, oxidizing said fuel in said chamber, and exhausting the resulting gases from said combustion chamber so as to impart a thrust.

3. The method of operating a jet-propulsion engine which comprises injecting a stream of an oxidizing agent and a stream of a hydrocarbon fuel comprising essentially the bis(alkylcyclohexyl)alkane defined in claim 1 into the combustion chamber of said engine, oxidizing said fuel in said chamber, and exhausting the resulting gases in a rearward direction from said chamber so as to impart thrust to said engine.

4. The method of operating a gas-turbine engine which comprises injecting a stream of an oxidizing agent and a stream of a hydrocarbon fuel comprising essentially the bis(alkylcyclohexyl)alkane defined in claim 1 into the combustion chamber of said engine, oxidizing said fuel in said chamber, and exhausting the resulting gases from said chamber through a turbine to develop motive power.

5. The method of operating a turbo-jet engine which comprises injecting a stream of air and a stream of hydrocarbon fuel comprising essentially the bis(alkylcyclohexyl)alkane defined in claim 1 into the combustion chamber of said engine, oxidizing said fuel in said chamber, and exhausting the resulting gases from said chamber through a turbine to expand the same and compress the air supplied to said chamber, and passing said gases into the atmosphere by way of a nozzle to impart thrust to said engine.

6. The method of operating a turbo-jet engine which comprises injecting into the combustion chamber of said engine a stream of air and a stream of hydrocarbon fuel comprising essentially a bis(alkylcyclohexyl)alkane of the formula

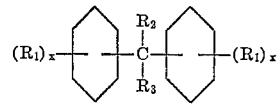

wherein $R_1$ is alkyl of from 1 to 4 carbon atoms, $R_2$ and $R_3$ are selected from the class consisting of hydrogen and alkyl of from 1 to 4 carbon atoms, the sum of the number of carbon atoms in $R_2$ and $R_3$ being not greater than 5, and $x$ is an integer of from 1 to 4, burning said fuel in said chamber, and exhausting the resulting gases from said chamber through a turbine to expand the same and compress the air supplied to said chamber, and passing said gases into the atmosphere by way of a nozzle to impart thrust to said engine.

7. The method of operating a turbo-jet engine which comprises injecting into the combustion chamber of said engine a stream of air and a stream of hydrocarbon fuel comprising essentially a bis(alkylcyclohexyl)alkane of the formula

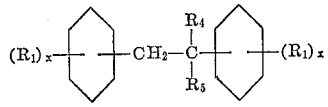

wherein $R_1$ is alkyl of from 1 to 4 carbon atoms, $R_4$ and $R_5$ are selected from the class consisting of hydrogen and alkyl of from 1 to 4 carbon atoms, the sum of the carbon atoms in $R_4$ and $R_5$ being not greater than 4, and exhausting the resulting gases from said chamber through a turbine to expand the same and compress the air supplied to said chamber, and passing said gases into the atmosphere by way of a nozzle to impart thrust to said engine.

8. The method of operating a turbo-jet engine which comprises injecting into the combustion chamber of said engine a stream of air and a stream of a bis(alkylcyclohexyl)alkane of the formula

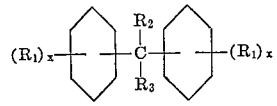

wherein $R_1$ is alkyl of from 1 to 4 carbon atoms, $R_2$ and $R_3$ are selected from the class consisting of hydrogen and alkyl of from 1 to 4 carbon atoms, the sum of the number of carbon atoms in $R_2$ and $R_3$ being not greater than 5, and $x$ is an integer of from 1 to 4, burning said bis(alkylcyclohexyl)alkane in said chamber, and exhausting the gases from said chamber through a turbine to expand the same and compress the air supplied to said chamber, and passing said gases into the atmosphere by way of a nozzle to impart thrust to said engine.

9. The method of operating a turbo-jet engine which comprises injecting into the combustion chamber of said engine a stream of air and a stream of a bis(alkylcyclohexyl)alkane of the formula

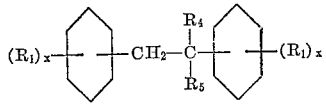

wherein $R_1$ is alkyl of from 1 to 4 carbon atoms, $R_4$ and $R_5$ are selected from the class consisting of hydrogen and alkyl of from 1 to 4 carbon atoms, the sum of the carbon atoms in $R_4$ and $R_5$ being not greater than 4, burning said bis(alkylcyclohexyl)alkane in said chamber, and exhausting the gases from said chamber through a turbine to expand the same and compress the air supplied to said chamber, and passing said gases into the atmosphere by way of a nozzle to impart thrust to said engine.

10. The method of operating a turbo-jet engine which comprises injecting into the combustion chamber of said engine a stream of air and a stream of bis(ethylcyclohexyl)methane, effecting combustion in said chamber, and exhausting the gases from said chamber through a turbine to expand the same and compress the air supplied to said chamber, and passing said gases into the atmosphere by way of a nozzle to impart thrust to said engine.

11. The method of operating a turbojet engine which comprises injecting into the combustion chamber of said engine a stream of air and a stream of bis(2,4,6-trimethylcyclohexyl)methane, effecting combustion in said chamber, and exhausting the gases from said chamber through a turbine to expand the same and compress the air supplied to said chamber, and passing said gases into the atmosphere by way of a nozzle to impart thrust to said engine.

12. The method of operating a turbo-jet engine which comprises injecting into the combustion chamber of said engine a stream of air and a stream of 1,1-bis(ethylcyclohexyl)ethane, effecting combustion in said chamber, and exhausting the gases from said chamber through a turbine to expand the same and compress the air supplied to said chamber, and passing said gases into the atmosphere by way of a nozzle to impart thrust to said engine.

13. The method of operating a turbo-jet engine which comprises injecting into the combustion chamber of said engine a stream of air and a stream of 1,1-bis(dimethylcyclohexyl)ethane, effecting combustion in said chamber, and exhausting the gases from said chamber through a turbine to expand the same and compress the air supplied to said chamber, and passing said gases into the atmosphere by way of a nozzle to impart thrust to said engine.

14. The method of operating a turbo-jet engine which comprises injecting into the combustion chamber of said engine a stream of air and a stream of 1,1-bis(methylcyclohexyl)ethane, effecting combustion in said chamber, and exhausting the gases from said chamber through a turbine to expand the same and compress the air supplied to said chamber, and passing said gases into the atmosphere by way of a nozzle to impart thrust to said engine.

References Cited in the file of this patent

UNITED STATES PATENTS

| | | |
|---|---|---|
| 2,331,596 | Campbell | Oct. 12, 1943 |
| 2,514,546 | Ipatieff et al. | July 11, 1950 |
| 2,622,110 | Ipatieff et al. | Dec. 16, 1952 |
| 2,765,617 | Gluesenkamp et al. | Oct. 9, 1956 |
| 2,826,037 | Scott et al. | Mar. 11, 1958 |
| 3,058,300 | Kosmin | Oct. 16, 1962 |